(12) United States Patent
Sayo (10) Patent No.: US 12,296,827 B1
(45) Date of Patent: May 13, 2025

(54) CONTROL DEVICE FOR VEHICLE

(71) Applicant: TOYOTA JIDOSHA KABUSHIKI KAISHA, Toyota (JP)

(72) Inventor: Kazutaka Sayo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/884,345

(22) Filed: Sep. 13, 2024

(30) Foreign Application Priority Data

Nov. 13, 2023 (JP) ................................ 2023-193265

(51) Int. Cl.
| | |
|---|---|
| *B60W 30/18* | (2012.01) |
| *B60K 35/28* | (2024.01) |
| *B60W 10/10* | (2012.01) |
| *B60W 10/18* | (2012.01) |
| *B60W 10/30* | (2006.01) |
| *B60W 20/00* | (2016.01) |

(52) U.S. Cl.
CPC ........... *B60W 30/181* (2013.01); *B60K 35/28* (2024.01); *B60W 10/10* (2013.01); *B60W 10/182* (2013.01); *B60W 10/30* (2013.01); *B60W 20/00* (2013.01); *B60W 2510/242* (2013.01); *B60W 2520/10* (2013.01); *B60W 2530/00* (2013.01); *B60W 2710/10* (2013.01); *B60W 2710/186* (2013.01); *B60W 2710/242* (2013.01); *B60W 2710/305* (2013.01)

(58) Field of Classification Search
CPC .............. B60W 10/06; B60W 10/182; B60W 2510/0666; B60W 2510/186; B60W 2710/10; B60W 2710/186; B60W 2710/305
See application file for complete search history.

(56) References Cited

U.S. PATENT DOCUMENTS

| | | | |
|---|---|---|---|
| 8,862,284 B2 * | 10/2014 | You ......................... | B60R 25/00 |
| | | | 701/2 |
| 10,690,237 B2 * | 6/2020 | Kim ........................ | F16H 59/74 |
| 2016/0186859 A1 | 6/2016 | Parker, Jr. et al. | |

FOREIGN PATENT DOCUMENTS

| | | |
|---|---|---|
| JP | 2019-127947 A | 8/2019 |
| WO | 2015/016109 A1 | 2/2015 |

* cited by examiner

*Primary Examiner* — Huan Le
(74) *Attorney, Agent, or Firm* — SoraIP, Inc.

(57) ABSTRACT

An electronic control unit of a vehicle having an automatic park-range switching function for automatically turning off a power supply after switching to a P range when a power-off operation is performed, wherein when a power-off operation is performed in a state where the automatic park-range switching function is disabled by a predetermined special operation, the vehicle is turned off in a state where the vehicle is in a neutral range and the power supply is turned off in a state where power supply to the electrical components is interrupted. As a result, the vehicle is parked in a movable state, and battery exhaustion of the power supply is suppressed.

5 Claims, 6 Drawing Sheets

CONTROL DEVICE FOR VEHICLE

CROSS-REFERENCE TO RELATED APPLICATION

This application claims priority to Japanese Patent Application No. 2023-193265 filed on Nov. 13, 2023, incorporated herein by reference in its entirety.

BACKGROUND

1. Technical Field

The disclosure relates to a control device for a vehicle that is provided with an automatic park-range switching function which, when a power-off operation is performed, automatically switches to a park range and then turns off a power source.

2. Description of Related Art

There is known a control device for a vehicle that is provided with an automatic park-range switching function which, when a power-off operation is performed, automatically switches to a park range and then turns off a power source. An example is that described in Japanese Unexamined Patent Application Publication No. 2019-127947 (JP 2019-127947 A). In JP 2019-127947 A, when a shift lever is operated and set to a neutral range, and the shift lever is operated again and held for a certain amount of time in a neutral position, and thereafter a power-off operation is performed, the power source is turned off in a state in which the automatic park-range switching function is disabled. In this case, the neutral range is maintained, and also the power source is turned off in a state in which power supply to traveling equipment related to traveling of the vehicle is interrupted, and also in which some electric components, such as a display device or the like can be used, i.e., in a state in which a so-called accessory power source is on. That is to say, the power source is turned off in a state in which power is supplied to the electrical component.

SUMMARY

Now, in some countries, in order to effectively utilize parking lots, another vehicle may be parked in tandem in front of a parked vehicle. In this case, for the vehicle that is parked to depart, the other vehicle parked in tandem is an obstruction, and thus it is necessary to move the other vehicle. When a power-off operation has been performed in the other vehicle in a state in which the automatic park-range switching function thereof is disabled, the other vehicle can be moved, but the power source is in a state in which the power supply to the electrical components is maintained. Accordingly, when the other vehicle is parked for a long period of time, power stored in the power source may be consumed, resulting in a dead battery.

The disclosure has been made in view of the above circumstances, and an object thereof is to provide a control device for a vehicle that is parked in a movable state of the vehicle and that suppresses occurrence of a dead battery.

A gist of the disclosure is a control device for a vehicle that is provided with an automatic park-range switching function that, when a power-off operation is performed, automatically switches to a park range and then turns off a power source, in which, when the power-off operation is performed in a state in which the automatic park-range switching function is disabled by a predetermined special operation, the power source is turned off in a state in which a neutral range is set and also supply of power to an electrical component is interrupted.

According to the control device of the vehicle of the disclosure, when the power-off operation is performed in a state in which the automatic park-range switching function is disabled by a predetermined special operation, the power source is turned off in a state in which the neutral range is set and also in which the supply of power to the electrical components is interrupted. Thus, the vehicle is parked in a movable state by being in a state of the neutral range, and the power source is turned off in a state in which the power supply to the electrical components is interrupted, whereby occurrence of a dead battery is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. Note that, in the embodiments, the drawings are simplified or modified as appropriate, and the dimensional ratios, shapes, and the like of the respective portions are not necessarily drawn accurately.

EXAMPLES

Figure 1:
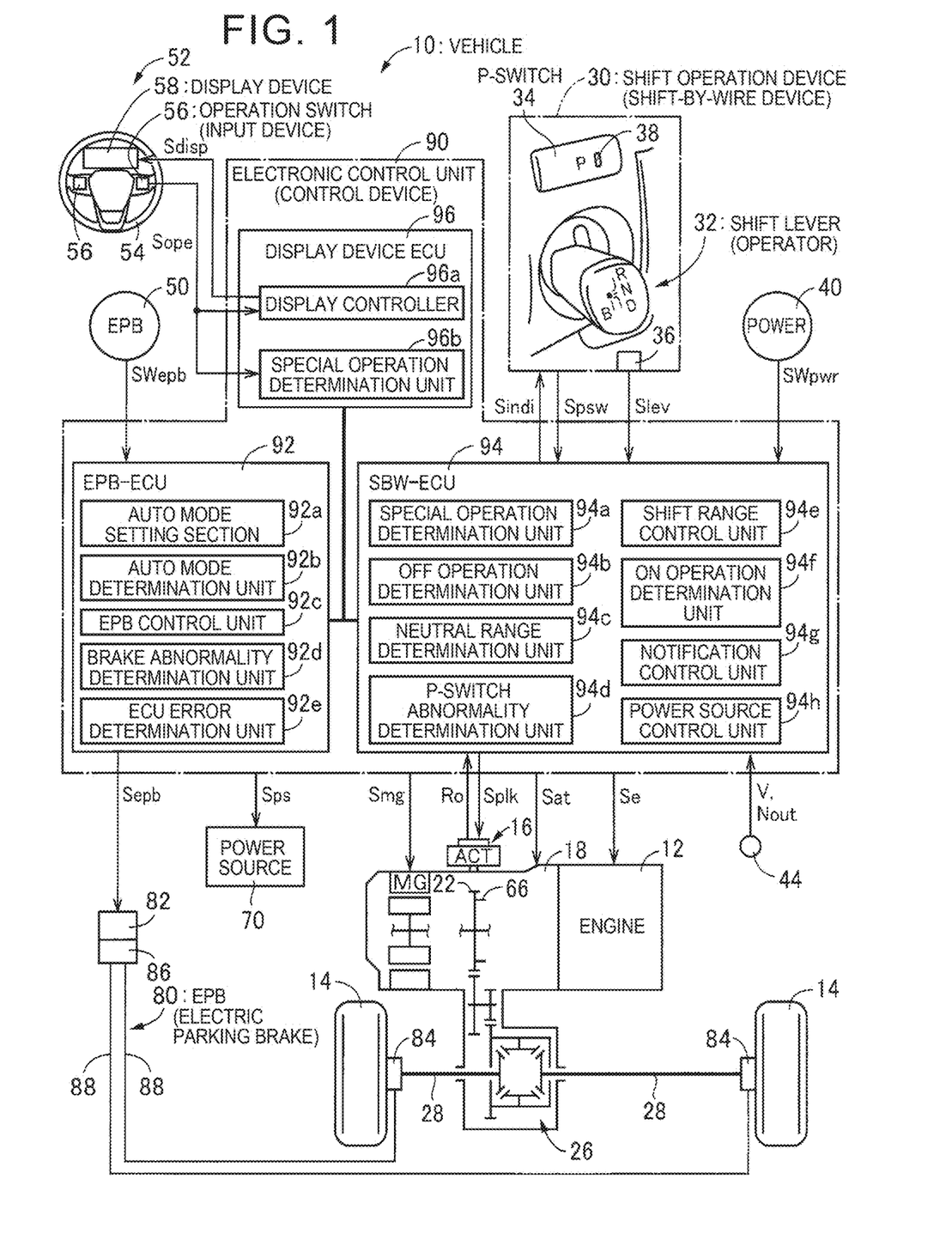
FIG. 1 is a schematic configuration diagram of a vehicle including an electronic control unit according to an embodiment of the present disclosure, and is a functional block diagram illustrating a main part of a control function for various types of control in the vehicle.

FIG. 1 is a schematic configuration diagram of a vehicle 10 including an electronic control unit 90 according to an embodiment of the present disclosure, and is a functional block diagram illustrating a main part of a control function for various types of control in the vehicle 10.

The vehicles 10 include, for example, an engine 12 and an electric motor MG as power sources for traveling, which are well known in the art. The vehicles 10 are hybrid electric vehicle. The vehicle 10 includes, in order from the engine 12 side, an automatic transmission 18, a differential 26, a pair of axles 28, and the like in the power transmission path between the engine 12 and the pair of drive wheels 14, and all of these are well-known configurations. The vehicle 10 includes a shift operation device 30, a power switch 40, an EPB switch 50, a steering device 52, an EPB 80, an electronic control unit 90, a power source 70, and the like.

The shift operation device 30 employs a so-called shift-by-wire (Shift By Wire) system. The shift operation device 30 includes, for example, a shift lever 32 and a P-switch 34. The shift lever 32 and the P-switch 34 are operators that are returned to the initial position when neither is operated by the driver (in other words, automatic return type operators that automatically return to the initial position when the operating force is released). The shift operation device 30 corresponds to a "shift-by-wire device" that realizes an automatic park-range switching function described later in the present disclosure.

The operation positions of the shift lever 32 are, for example, positions of "H position", "R position", "N position", "D position", and "B position". The "H position" is an initial position (=home position) of the shift lever 32. The "R position" is an operation position for selecting the R range. The R range is a shift range that enables the vehicle 10 to travel backward. The "N position" is an operation position for selecting a neutral range. The neutral range is a shift range in which the power transmission from the power source for traveling to the pair of drive wheels 14 is interrupted to a neutral state. For example, in the neutral range, the automatic transmission 18 is in a neutral state. The "D position" is an operation position for selecting the D range. The D range is a shift range that enables the vehicle 10 to travel forward. The "B position" is an operation position for selecting a deceleration forward traveling state in which the engine brake using the engine 12 is easily applied (that is, a state in which the engine brake effect is obtained more strongly) in a state in which the power transmission path for forward traveling is formed by the operation to the "D position".

The P-switch 34 is, for example, a momentary push button switch. In a state where the pressing operation of the P-switch 34 is not performed, the P-switch 34 is set to its initial position (i.e., home position). When the pressing operation of the P-switch 34 is performed, the P range (=parking range) is selected. The P range is a shift range in which the vehicle 10 is in a neutral state and the pair of drive wheels 14 are mechanically fixed so as not to rotate. The "non-N range" is a shift range other than the N range, that is, a P range, an R range, a D range, and a B range. The "non-P range" is a shift range other than the P range, that is, an R range, a neutral range, a D range, and a B range.

For example, when any of the shift ranges is selected, the automatic transmission 18 is controlled to a state corresponding to the selected shift range. When the driver presses the P-switch 34 in the case where the vehicle 10 is in the stop state or the extremely low vehicle speed state, the automatic transmission 18 is in the neutral state and the parking lock device 16 is activated.

Figure 2:
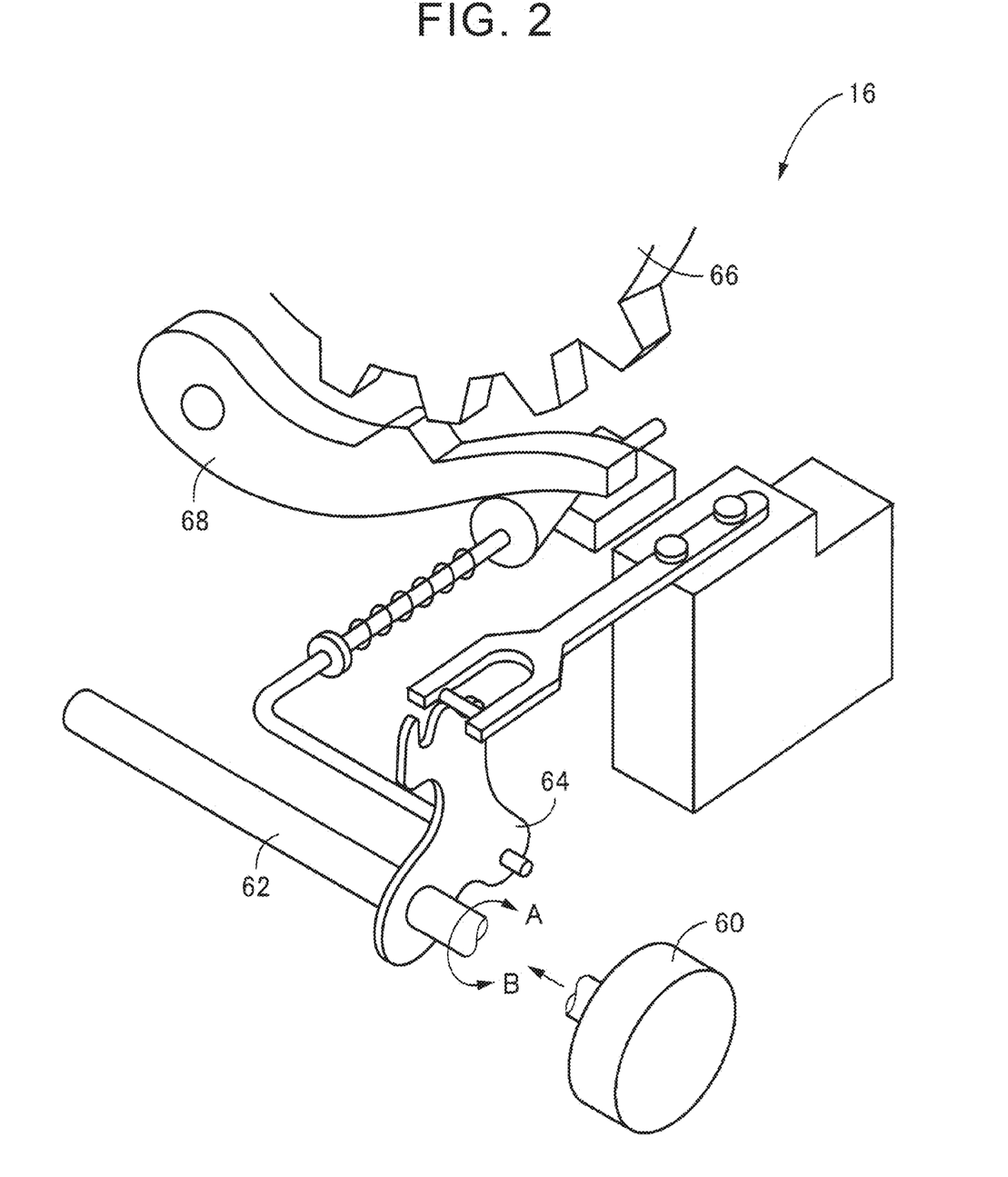
FIG. 2 is a perspective view illustrating a configuration of the parking lock device illustrated in FIG. 1.

FIG. 2 is a perspective view illustrating a configuration of the parking lock device 16 illustrated in FIG. 1. The parking lock device 16 is a known parking lock device, and includes a locked state in which the parking gear 66 rotating in conjunction with the pair of drive wheels 14 is prevented from rotating, and an unlocked state in which the parking gear 66 is allowed to rotate. In the unlocked state, when the shaft 62 and the detent plate 64 are rotated in the direction of the arrow A by the shift control motor 60, the parking pole 68 is switched to the locked state meshed with the parking gear 66. In the locked state, when the shaft 62 and the detent plate 64 are rotated in the direction of the arrow B by the shift control motor 60, the engagement between the parking pole 68 and the parking gear 66 is switched to the unlocked state. When the parking lock device 16 is in the locked state, the indicator lamp 38 (see FIG. 1) is turned on to indicate the P range.

Return to FIG. 1. EPB 80 is a known electric parking brake, and corresponds to an "electric parking brake" in the present disclosure. In FIG. 1, the wheel brake 84 is provided on each of the pair of drive wheels 14, but the present disclosure is not limited thereto and may be provided on a pair of driven wheels. In EPB 80, for example, when EPB electric motor 82 is rotationally driven to draw the pair of cables 88 through the cable pull-in device 86, the wheel brake 84 is operated to apply a braking force to the vehicles 10, that is, EPB 80 is braked. When EPB motor 82 is rotated to a predetermined position, the cable pull-in device 86 is configured to mechanically retain the tension of the cable 88. When EPB motor 82 is rotationally driven in the reverse direction, the operation of the wheel brake 84 is released, that is, EPB 80 is in the non-braking state. A pair of drive wheels 14 or a pair of driven wheels on which wheel brake 84 of the EPB 80 is provided corresponds to a "wheel" in the present disclosure.

The power source 70 is a vehicle power source capable of supplying electric power to a traveling device related to vehicle traveling, electric components such as car audio and a navigation system not related to vehicle traveling, and is a secondary battery. For example, the traveling equipment is an electric motor MG, an auxiliary machine that controls the engine 12, or the like. For example, the power source 70 may be divided into a battery that supplies electric power to the electric motor MG and a battery that supplies electric power to another device.

The power switch 40 is a switch for the driver to switch the state of power supply of the vehicle 10. The power switch 40 is, for example, an automatic return type push button switch disposed in the vicinity of the driver's seat. For example, the mode of the power source of the power source 70, a state in which the power source to both the traveling device and the electrical components is performed "power-on mode", a state in which the power source to the traveling device is disconnected and the power source to the electrical components is performed "partially on power-off mode", and a state in which the power source to both the traveling device and the electrical components is disconnected "power-off mode". For example, the mode of power source of the power source 70 is switched by a pressing operation of the power switch 40. Here, "turning off the power source 70" refers to switching the power source 70 from the power-on mode to one of the partially-on power-off mode and the power-off mode, and the operation of the power switch 40 for turning off the power source 70 is referred to as "power-off operation". "Turning on the power source 70" refers to switching the power source 70 from one of a partial on-off mode and a power-off mode to a power-on mode, and the operation of the power switch 40 for turning on the power source 70 is referred to as a "power-on operation". In the "partially on-power-off mode", since power is supplied to the electrical components, battery rise is more likely to occur than in the power-off mode.

The steering device 52 includes a steering wheel 54 for a driver to steer the vehicle 10. The steering wheel 54 is provided with, for example, an operation switch 56 operable by a driver. The vehicle 10 is provided with a display device 58 at a position that is easy for the driver to visually recognize. The operation switch 56 corresponds to an "input device" in the present disclosure.

The vehicle 10 has an automatic park-range switching function of automatically switching the power source 70 to the P range when a power-off operation is performed. The vehicles 10 also have an automatic EPB function in which EPB 80 is automatically braked after being placed in the P range.

Figure 3:
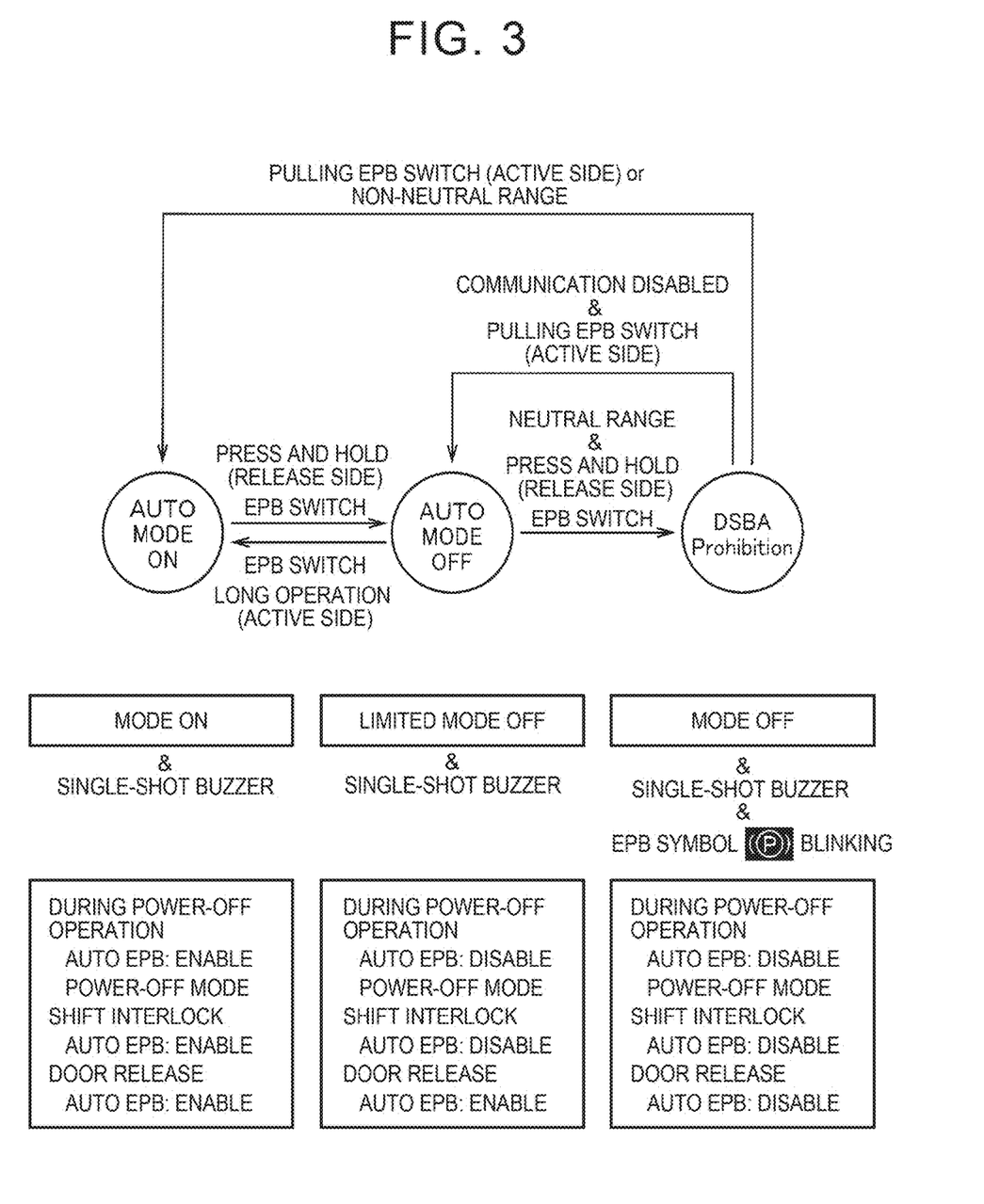
FIG. 3 is a diagram illustrating an example of a predetermined special operation performed by the operation of the shift lever and EPB switch for switching the condition for enabling the automatic EPB function.

FIG. 3 is a diagram for explaining an exemplary predetermined special operation by the operation of the shift lever 32 and EPB switch 50 for switching the condition for enabling the automatic EPB function. EPB switch 50, for example, can be a push operation and pull operation. The shift lever 32 corresponds to an "operator" in the present disclosure.

The condition that the automatic EPB function is enabled is referred to as "auto mode". The "auto mode" corresponds to the "operating mode" in the present disclosure. For example, there are three types of auto modes: "mode on" (in FIG. 3, AUTO MODE ON is displayed), "limited mode off" (in FIG. 3, AUTO MODE OFF is displayed), and "mode off" (in FIG. 3, DSBA Prohibition is displayed). In the "mode on", the automatic EPB function is enabled when at least one of (i) a power-off operation is performed in the stop condition, (ii) a pressing operation of the P-switch 34 is performed and the P-range is switched from the non-P-range to the P-range, and (iii) any one of the doors of the vehicles 10 is opened. When the power-off operation is performed in the "mode on", the power source 70 is in the power-off mode. In the "limited mode off", the automatic EPB function is enabled in the case of (iii), and the automatic EPB function is disabled in the case of (i) and (ii). When the power-off operation is performed in the "limited mode off", the power source 70 is set to the power-off mode. In the "mode-off" mode, the automatic EPB function is disabled in any of the above (i), (ii), and (iii). When the power-off operation is performed in the "mode-off" state, the power source 70 is set to the power-off mode.

When the auto mode is "mode on" and a long press operation is performed in which EPB switch 50 is pressed for a predetermined duration Tlng1 [sec] or more in the neutral range, the mode is switched from "mode on" to "limited mode off". This long press operation is a release operation for switching the auto-mode to the release side. The predetermined period Tlng1 is a predetermined time, for example, several seconds, in order to distinguish between the long pressing operation and the pressing operation other than the long pressing operation which is the releasing operation. When the auto mode is "limited mode off" and the auto mode is in the neutral range, when the long pressing operation of EPB switch 50 is performed as the release operation, the mode is switched from "limited mode off" to "mode off". A switching operation to the neutral range and a long pressing operation of EPB switch 50 when the auto mode is "mode on" and a long pressing operation of EPB switch 50 in the neutral range thereafter are referred to as "first special operation". The first special operation corresponds to a "predetermined special operation" in the present disclosure. When a lengthening operation is performed in which EPB switch 50 is operated for a predetermined time Tlng2 [sec] or longer when the auto mode is "limited mode off", the mode is switched from "limited mode off" to "mode on". The extension operation is an operation for switching the auto mode to the operation side. The predetermined period Tlng2 is a predetermined time period, for example, several seconds, in order to distinguish between a lengthening operation and a pulling operation other than a lengthening operation that is an operation. When the auto mode is "mode-off", EPB switch 50 is pulled and the communication network between ECU described later is in an abnormal state (=invalid state), the mode is switched from "mode-off" to "limited mode-off". When the auto mode is "mode-off", when (a) EPB switch 50 is pulled and the communication network between ECU is in a normal state (=valid state) or (b) the shift range is switched to the non-neutral range, the mode is switched from "mode-off" to "mode-on". These pulling operations are operation operations for switching the auto mode to the operation side. The pressing operation, the long pressing operation, the pulling operation, and the long pulling operation of EPB switch 50 correspond to the "operation of selecting the operation mode of the electric parking brake" in the present disclosure. In the example shown in FIG. 3, the pressing operation and the long pressing operation of EPB switch 50 are the release operation, and the pulling operation and the long pulling operation of EPB switch 50 are the operation, but the pressing operation and the long pressing operation of EPB switch 50 are the operation, and the pulling operation and the long pulling operation of EPB switch 50 may be the release operation.

Figure 4:
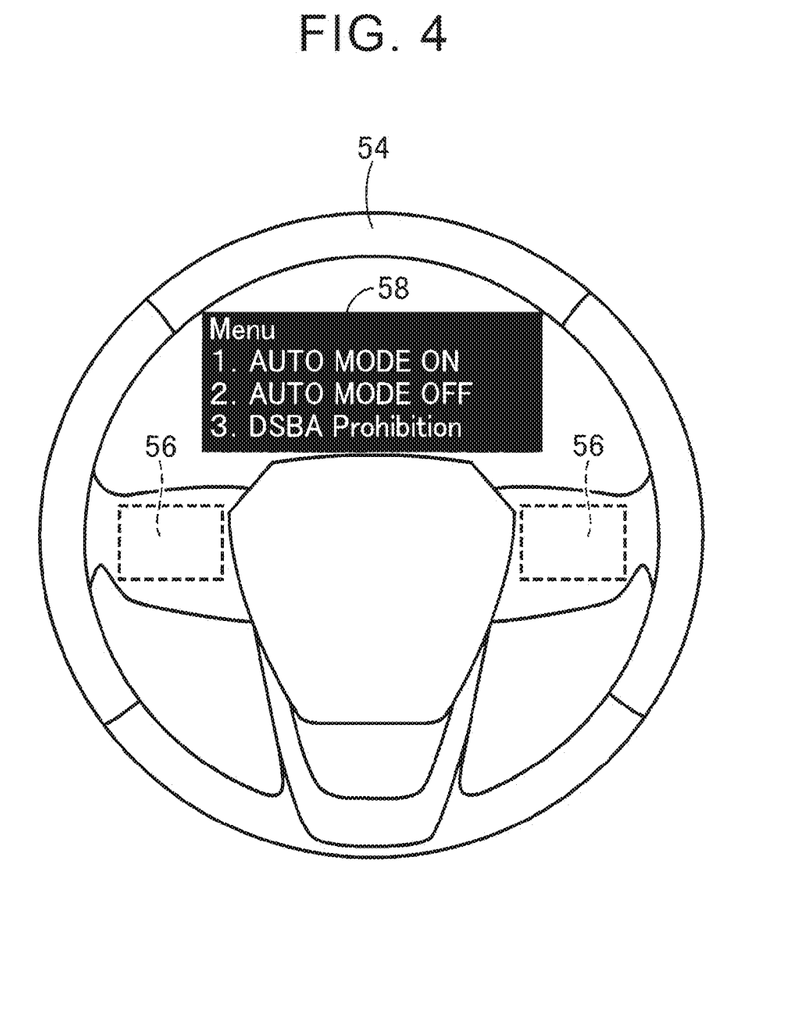
FIG. 4 is a diagram for explaining an example of a predetermined special operation performed by an operation of an operation switch for switching a condition for enabling an automatic EPB function.

FIG. 4 is a diagram for explaining an exemplary predetermined special operation performed by the operation of the operation switch 56 for switching the condition for enabling the automatic EPB function.

As illustrated in FIG. 4, the display device 58 displays "mode on" (=AUTO MODE ON), "limited mode off" (=AUTO MODE OFF), and "mode off" (=DSBA Prohibition) of the auto mode as selectable menus by operating the operation switch 56. The driver can select one of the menus by operating the operation switch 56. The operation of the operation switch 56 for selecting "mode off" (=DSBA Prohibition) from the menu is referred to as "second special operation". For example, when the vehicle speed V [km/h] is equal to or lower than the predetermined vehicle speed V_jdg, the second special operation is enabled, and otherwise, the second special operation is disabled. That is, the second special operation is permitted only when the vehicle speed V is equal to or lower than the predetermined vehicle speed value V_jdg. The predetermined vehicle speed value V_jdg is a predetermined vehicle speed value that allows the operation of the operation switch 56 to be safely performed, and is, for example, a vehicle speed value slightly higher than zero in the vicinity of zero. The second special operation corresponds to a "predetermined special operation" in the present disclosure.

Return to FIG. 1. The electronic control unit 90 includes a plurality of ECU that function as a control device for controlling the respective units of the vehicles 10. Note that the electronic control unit 90 corresponds to a "control device" in the present disclosure. The electronic control unit 90 includes an EPB-ECU 92, SBW-ECU 94 and a display device ECU 96. EPB-ECU 92 is an ECU that controls the operation of EPB 80. SBW-ECU 94 is an ECU for controlling switching of the shift range of the vehicles 10 and supplying power to the power source 70. The display device ECU 96 is an ECU that causes the display device 58 to display a menu so that the auto mode can be selected by operating the operation switch 56. For example, EPB-ECU 92, SBW-ECU 94 in the electronic control unit 90 and the respective ECU of the display device ECU 96 are connected to a communication network using controller area network (CAN) communication circuitry. This allows ECU to enter each other. For example, each ECU is configured to include a so-called microcomputer having a CPU, a RAM, a ROM, an input-output interface and the like. The CPU executes various controls for the vehicle 10 by performing signal processing in accordance with programs stored in the ROM in advance, while using the temporary storage function of the RAM. In the present embodiment, the electronic control unit 90 is divided into a plurality of ECU, but all or a part of them may be combined in a common ECU as needed.

For example, an EPB switch SWepb indicating that a pressing operation, a long pressing operation, a pull operation, or a long operation of EPB switch 50 has been performed is inputted to EPB-ECU 92. An EPB control Sepb for switching between the braking state and the non-braking state of EPB 80 is outputted from EPB-ECU 92.

In SBW-ECU 94, various sensors or the like (e.g., lever position sensor 36, P-switch 34, shift control electric motor 60, power switch 40, the output rotation sensor 44, etc.) various signals or the like based on the detected value (e.g., lever position signal Slev representing the position of the shift lever 32, P-switch signal Spsw representing the pressing operation of the P-switch 34, the rotation amount signal Ro[rad representing the rotation angle of the shift control electric motor 60], power switch signal SWpwr representing the pressing operation of the power switch 40 is performed, the output speed Nout [rpm is the rotation speed of the output gear 22 corresponding to the vehicle speed V, etc.), are inputted, respectively. From SBW-ECU 94, various command signals (e.g., engine 12, electric motor MG, automatic transmission 18, parking lock device 16, indicator lamp 38, etc.) to the respective devices provided in the vehicle 10 (e.g., engine control signal Se for controlling the engine 12, MG control signal Smg for controlling the electric motor MG, shift control signal Sat for performing shift control of the automatic transmission 18, parking lock control signal Splk for switching between the locked state and the unlocked state of the parking lock device 16, P range indication signal Sindi for indicating that the present shift range is P range, etc.) are outputted, respectively. From the electronic control unit 90, a power source control signal Sps for controlling the power-supply status of the power source 70 is outputted to the power source 70.

For example, an operation signal Sope indicating that an operation is performed by the operation switch 56 is inputted to the display device ECU 96. A display control Sdisp for controlling the display content of the display device 58 is outputted from the display device ECU 96.

EPB-ECU 92 functionally includes an auto mode setting unit 92a, an auto mode determination unit 92b, EPB control unit 92c, a brake abnormality determination unit 92d, and an ECU abnormality determination unit 92e.

The auto mode setting unit 92a sets the auto mode. The auto mode determination unit 92b determines whether or not the auto mode is "mode off". EPB control unit 92c performs switching control from one of the braking state and the non-braking state of EPB 80 to the other.

The brake abnormality determination unit 92d determines whether or not at least one of the parking lock device 16 and EPB 80 is in an abnormal condition. For example, when the rotational speed signal Ro does not correspond to the parking lock control signal Splk, it is determined that the parking lock device 16 is in an abnormal condition. For example, if the position of a parking brake shoe lever (not shown) that is operatively connected to the cable 88 is detected by a position sensor (not shown), if the position of the parking brake shoe lever does not correspond to EPB control signal Sepb, EPB 80 is determined to be in an abnormal condition.

ECU abnormality determination unit 92e determines whether or not a cooperative operation (hereinafter, referred to as "ECU cooperative operation") between EPB-ECU 92 and SBW-ECU 94 or the display device ECU 96 is an abnormal condition. For example, ECU anomaly determination unit 92e determines whether or not the communication networks between ECU are abnormal. When SBW-ECU 94 or the display device ECU 96 is in an abnormal state or the communication network is in an abnormal state such as a disconnection, it is determined that ECU cooperation operation is in an abnormal state.

SBW-ECU 94 functionally includes a special operation determination unit 94a, an off operation determination unit 94b, an neutral range determination unit 94c, a P-switch abnormality determination unit 94d, a shift range control unit 94e, an on operation determination unit 94f, a notification control unit 94g, and a power source control unit 94h. The display device ECU 96 functionally includes a display control unit 96a and a special operation determination unit 96b.

The special operation determination unit 94a determines whether or not the first special operation has been executed by the driver. The display control unit 96a causes the display device 58 to display an auto-mode menu by operating the operation switch 56. The special operation determination unit 96b determines whether or not the second special operation has been executed by the driver. When it is determined that at least one of the first special operation and the second special operation has been executed, the auto mode setting unit 92a sets the auto mode to "mode off". In the present embodiment, two "predetermined special operations" in the present disclosure are prepared: a first special operation and a second special operation.

The off operation determination unit 94b determines whether or not a power-off operation has been performed. The neutral range determination unit 94c determines whether or not the shift range is the neutral range. The P-switch abnormality determination unit 94d determines whether or not the P-switch 34 is in an abnormal condition. For example, in a case where the power-off operation is performed in the stop state and the P-switch signal Spsw indicating the pressing operation of the P-switch 34 is not inputted continuously a predetermined number of times or more, it is determined that the P-switch 34 is in an abnormal state. The predetermined number of times is a predetermined number of times. The shift range control unit 94e controls the shift range based on the operation content of the shift operation device 30. The power source control unit 94h controls the power-supply status of the power source 70.

For example, when the auto mode is "mode-off" and the power-off operation is performed, when the shift range is in the neutral range, the P-switch 34 is not in the abnormal state, the parking lock device 16 and EPB 80 are both in the normal state, and ECU cooperation operation is not in the abnormal state, the neutral range power-off control is performed. The "neutral range power-off control" is a control in which the shift range control unit 94e maintains the shift range in the neutral range, EPB control unit 92c sets EPB 80 to the non-braking state, and the power source control unit 94h switches the power source 70 to the power-off mode.

For example, in a case where the auto mode is "mode on" and a power-off operation is performed, and in a case where either the shift range is the non-neutral range or the P-switch 34 is in an abnormal state, the automatic park-range switching function and the automatic EPB function are enabled. That is, the shift range control unit 94e sets the shift range to the P range, EPB control unit 92c sets EPB 80 to the braking status, and the power source control unit 94h turns off the power source 70.

For example, in a case where the auto mode is "limited mode off" and a power-off operation is performed, in a case where either the shift range is the non-neutral range or the P-switch 34 is in an abnormal state, the automatic park-range switching function is enabled, the automatic EPB function is disabled, and the power source 70 is set to the power-off mode. That is, the shift range control unit 94e sets the shift range to the P range, EPB control unit 92c sets EPB 80 to the non-braking state, and the power source control unit 94h switches the power source 70 to the power-off mode.

For example, in a case where the power-off operation is performed, in either a case where at least one of the parking lock device 16 and EPB 80 is in an abnormal state or a case where ECU cooperation operation is in an abnormal state, the notification control unit 94g notifies the driver that the notification control unit is in an abnormal state.

The on operation determination unit 94f determines whether or not a power-on operation has been performed. When the power-on, the auto mode setting unit 92a sets the auto mode to "mode on". That is, when the power-on operation is performed after the power source 70 is turned off, the power source 70 is turned on and the automatic park-range switching function and the automatic EPB function are enabled.

Figure 5:
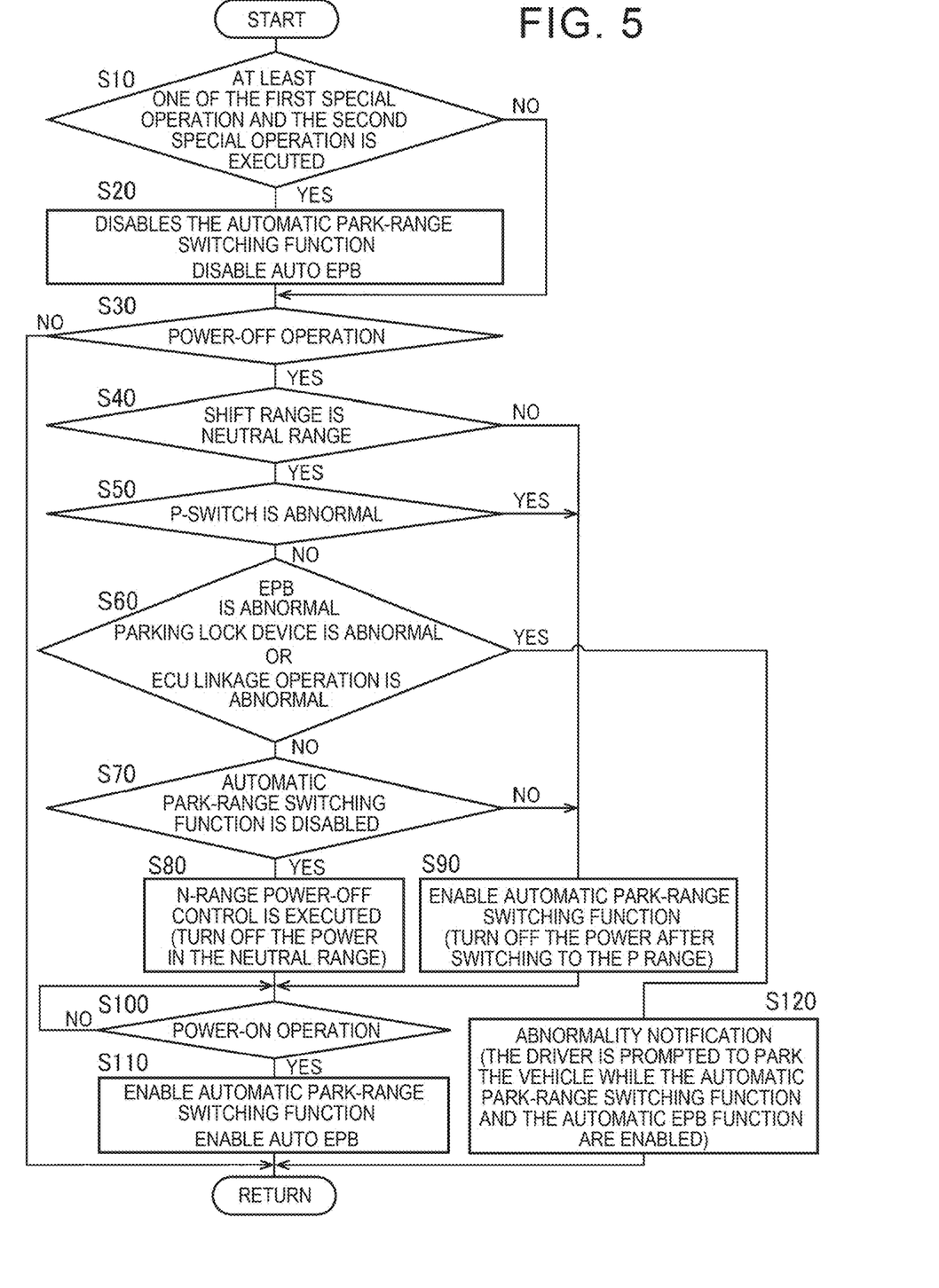
FIG. 5 is an exemplary flow chart illustrating the control operation of the electronic control unit shown in FIG. 1.

FIG. 5 is an example of a flowchart illustrating a control operation of the electronic control unit 90 illustrated in FIG. 1. The flowchart of FIG. 5 is repeatedly executed.

In S10 corresponding to the functions of the special operation determination unit 94a and the special operation determination unit 96b, it is determined whether or not a predetermined special operation has been executed. Hereinafter, the "step" will be omitted. When the determination of S10 is YES, the auto mode is changed to the "mode-off" in S20 corresponding to the function of the auto mode setting unit 92a, that is, the automatic park-range switching function and the automatic EPB function are disabled. After S20 is executed and when the determination of S10 is NO, it is determined whether or not a power-off operation has been performed in S30 corresponding to the function of the off operation determination unit 94b. When the determination of S30 is YES, it is determined whether or not the shift range is the neutral range in S40 corresponding to the function of the neutral range determination unit 94c. When the determination of S40 is YES, it is determined whether or not the P-switch 34 is in an abnormal condition in S50 corresponding to the function of the P-switch abnormality determination unit 94d. When the determination of S50 is NO, it is determined whether or not at least one of the brake abnormality determination unit 92d and ECU abnormality determination unit 92e is satisfied when the parking lock device 16 is in an abnormal state, when EPB 80 is in an abnormal state, and when ECU cooperation operation is in an abnormal state in S60 corresponding to the function.

When the determination of S60 is NO, in S70 corresponding to the function of the auto mode determination unit 92b, it is determined whether or not the auto mode is "mode off", that is, whether or not the automatic park-range switching function and the automatic EPB function are disabled. When the determination of S70 is YES, the neutral range power-off control is executed in S80 corresponding to the functions of the shift range control unit 94e, EPB control unit 92c and the power source control unit 94h. When the determination of S40 is NO, when the determination of S50 is YES, and when the determination of S70 is NO, the automatic park-range switching function and the automatic EPB function are enabled, the shift range is set to the P range, EPB 80 is activated, and the power source 70 is turned off in S90 corresponding to the functions of the shift range control unit 94e, EPB control unit 92c and the power source control unit 94h. After S80 is executed and after S90 is executed, it is determined whether or not a power-on operation has been performed in S100 corresponding to the function of the on operation determination unit 94f. S100 is executed again when NO is determined in S100. When the determination of S100 is YES, the auto mode is set to "mode on" in S110 corresponding to the function of the auto mode setting unit 92a.

When the determination of S60 is YES, the driver is notified of the abnormal condition in S120 corresponding to the function of the notification control unit 94g. Accordingly, the driver is prompted to park with the automatic park-range switching function and the automatic EPB function enabled.

When S30 is determined to be NO, after S110 is executed and after S120 is executed, both returns.

Figure 6:
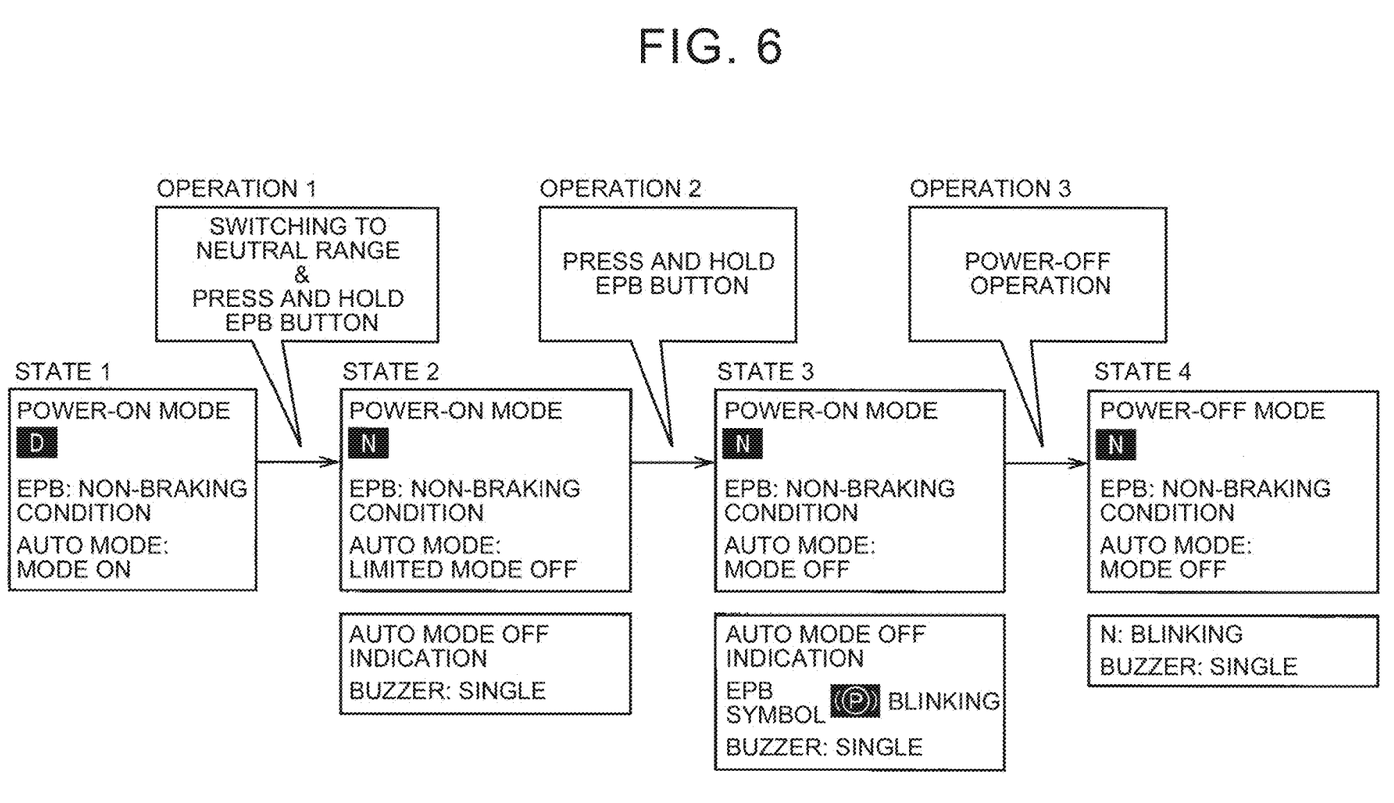
FIG. 6 is a diagram illustrating an example of execution of the neutral range power-off control.

FIG. 6 is a diagram illustrating an example of execution of the neutral range power-off control.

In the state 1, it is assumed that the power source 70 of the vehicle 10 is in the power-on mode, the shift range is in the D range, EPB 80 is in the non-braking state, and the auto mode is in the "mode-on" state. In the state 1, when the shift lever 32 is operated to the N position and EPB switch 50 is pressed and held, the vehicle 10 enters the state 2. At this time, a single buzzer sound is sounded and "AUTO MODE OFF" is displayed on the display device 58, for example. In the state 2, the power source 70 is in the power-on mode, the shift range is in the neutral range, EPB 80 is in the non-braking state, and the auto mode is in the "limited mode off". In the state 2, when EPB switch 50 is pressed for a long time, the vehicle 10 enters the state 3. At this time, a single buzzer sound is sounded, for example, "DSBA Prohibition" is displayed on the display device 58, and EPB symbol is flashed. EPB mark is a display mark for notifying the driver that the auto mode has been switched to the "mode off". In the state 3, the power source 70 is in the power-on mode, the shift range is in the neutral range, EPB 80 is in the non-braking state, and the auto mode is in the "mode-off" state. In the state 3, when the power-off operation is performed, the vehicle 10 enters the state 4. At this time, a single buzzer sound is sounded and the neutral range display is flashed. In the state 4, the power source 70 is in the power-off mode, the shift range is in the neutral range, EPB 80 is in the non-braking state, and the auto mode is in the "mode-off" state. The neutral range display corresponds to the "vehicle state display" in the present disclosure. Before the lapse of the predetermined period Tdis [sec] from the point in time when the power-off operation is performed and before the driver gets off, "vehicle state display" is displayed, and when at least one of after the lapse of the predetermined period Tdis and after the driver gets off, the vehicle state display is turned off. The predetermined period Tdis is a predetermined period so that the driver can recognize that the auto mode is "mode-off". The predetermined period Tdis corresponds to a "predetermined period" in the present disclosure.

According to the present embodiment, when the automatic park-range switching function and the automatic EPB function are disabled by at least one of the first special operation and the second special operation and the power-off operation is performed, the neutral range power-off control is executed. That is, the state of the neutral range and the power source 70 is a state in which the power source to the electrical components is interrupted. As a result, the vehicle 10 is parked in a movable state and the power source 70 is turned off in a state where the power source to the electrical components is cut off, thereby suppressing battery rise.

According to the present embodiment, when the power source is power-on after the power source 70 is turned off, the power source 70 is turned on and the automatic park-range switching function and the automatic EPB function are enabled. After the power source 70 is turned on, the vehicle 10 is generally caused to travel. When the automatic park-range switching function and the automatic EPB function are enabled, the vehicle 10 parked after the vehicle travels is prevented from being disabled in the automatic park-range switching function and the automatic EPB function contrary to the intention of the driver.

According to the present embodiment, (a) before a predetermined period Tdis elapses from the point in time when the power-off operation is performed and before the driver gets off, the display device 58 blinks the neutral range display, and (b) when at least one of after the lapse of the predetermined period Tdis and after the driver gets off, the display device 58 turns off the blinking of the neutral range display. The driver can recognize that the neutral range power-off control has been executed Tdis a predetermined duration, and the power consumed by the power source 70 is reduced by turning off the light.

According to the present embodiment, the first special operation is a long pressing operation of EPB switch 50 and a long pressing operation of EPB switch 50 in the neutral range thereafter, and the second special operation is an operation of the operation switch 56 for selecting "mode off" from the menu. As described above, the first special operation and the second special operation are operations independent of the vehicle travel, and thus, the neutral range power-off control is prevented from being executed contrary to the intention of the driver.

According to the present embodiment, the operation of disabling the automatic park-range switching function and the automatic EPB function via the operation switch 56 is enabled when the vehicle speed V is equal to or lower than the predetermined vehicle speed V_jdg, and is disabled otherwise. Thus, the second special operation can be safely performed.

It should be noted that the above-described embodiments of the present disclosure are examples of the present disclosure, and the present disclosure can be implemented in various modifications and improvements based on the knowledge of a person skilled in the art without departing from the gist thereof.

The present disclosure is not limited to hybrid electric vehicle, and the present disclosure is applicable to vehicles that include only the electric motor MG or only the engine 12 as a power source for traveling.

In the above-described embodiment, when the power-on operation is performed after the power source 70 is turned off, the automatic park-range switching function and the automatic EPB function are enabled. In the above-described embodiment, the "vehicle state display" is displayed when the power-off operation is performed, but the present disclosure is not limited thereto, and the "vehicle state display" may not be displayed.

In the above embodiment, the predetermined special operation is the first special operation or the second special operation, but the present disclosure is not limited thereto. The first special operation is not limited to the above-described embodiment, and may be other than the operation of the shift lever 32 of the shift operation device 30 and the operation of selecting the auto-mode by EPB switch 50. The second special operation is not limited to the operation of the operation switch 56, and may be, for example, a mode in which "mode off" is selected from a menu displayed on the screen by the operation of a switch provided in the navigation system. In the above-described embodiment, the operation in which the auto-P-switching function and the automatic EPB function are disabled via the operation switch 56 is limited to the case where the vehicle speed V is equal to or lower than the predetermined vehicle speed V_jdg, but the present disclosure is not limited thereto.

In the above embodiment, the vehicles 10 have an automatic EPB function, but the present disclosure is not limited thereto. For example, the present disclosure is also applicable to a mode in which the vehicles 10 do not have an automatic EPB function and EPB 80 is braked only by manual manipulation of the driver. In this aspect, when the power-off operation is performed in a state in which the automatic park-range switching function is disabled, the power source is turned off in a state in which the neutral range is set and the power source 70 is turned off in a state in which the power source to the electrical component is turned off. When EPB 80 is set to the non-braking condition by not performing the manual manipulation, the same advantages as those of the embodiment can be obtained.

In the above-described embodiment, when the power-off operation is performed when the auto mode is "mode on" or "limited mode off", the power source 70 is in the power-off mode, but the present disclosure is not limited thereto, and the power source 70 may be partially in the power-on-off mode.

What is claimed is:

1. A control device for a vehicle that is provided with an automatic park-range switching function that, when a power-off operation is performed, automatically switches to a park range and then turns off a power source, wherein when the power-off operation is performed in a state in which the automatic park-range switching function is disabled by a predetermined special operation, the power source is turned off in a state in which a neutral range is set and also supply of power to an electrical component is interrupted.

2. The control device according to claim 1, wherein when a power-on operation is performed after the power source being turned off, the power source is turned on and also the automatic park-range switching function is enabled.

3. The control device according to claim 1, wherein:
   before a predetermined period elapses from a point in time at which the power-off operation is performed, and also before a driver exits the vehicle, a vehicle state display indicating that a range is the neutral range is displayed; and
   when at least one of after the predetermined period elapsing, and after the driver exiting the vehicle, is realized, the vehicle state display is turned off.

4. The control device according to claim 1, wherein the predetermined special operation is at least one of a combination of an operation of a manipulator of a shift-by-wire device that realizes the automatic park-range switching function and a selection operation of an operation mode of an electric parking brake that applies a braking force to a wheel, and an operation of, after a menu for disabling the automatic park-range switching function is displayed on a display device, selecting disabling of the automatic park-range switching function from the menu via an input device.

5. The control device according to claim 4, wherein the operation of selecting disabling of the automatic park-range switching function via the input device is enabled when a vehicle speed of the vehicle is no higher than a predetermined vehicle speed value, and is disabled otherwise.

* * * * *